March 19, 1929. R. B. WILLIAMSON 1,706,369
CURRENT COLLECTING DEVICE
Filed Dec. 27, 1926
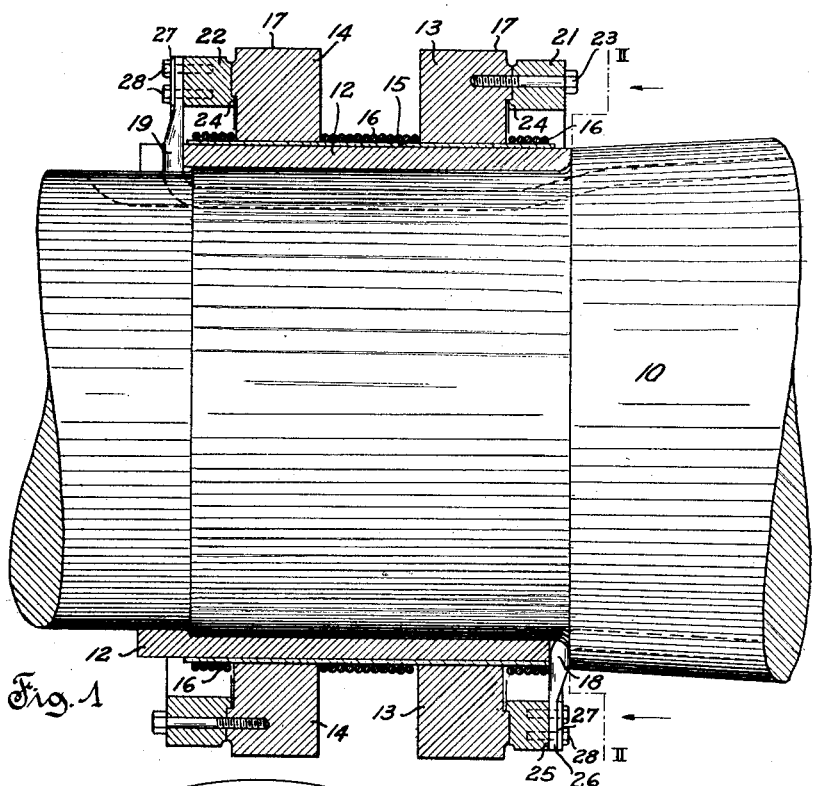
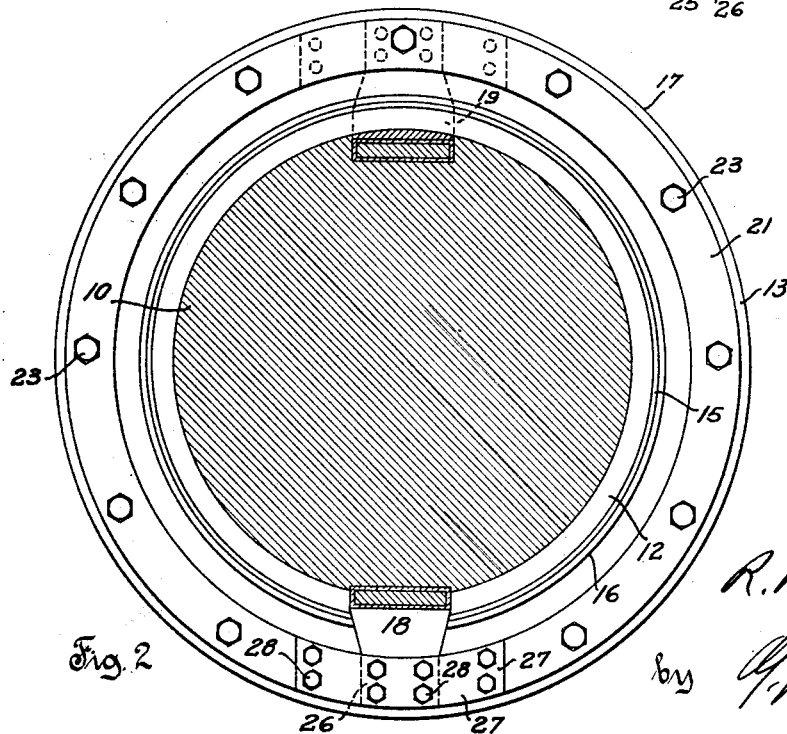
Inventor
R. B. Williamson
by
Attorney Patented Mar. 19, 1929.

1,706,369

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CURRENT-COLLECTING DEVICE.

Application filed December 27, 1926. Serial No. 157,323.

This invention relates in general to current-collecting devices for electrical machines, and it has more particularly relation to collector rings of the type ordinarily used for leading electrical current to and from the rotating element of a dynamo-electric machine.

In dynamo-electric machines of relatively large size, particularly turbo-generators and synchronous condensers, where the peripheral speeds of the collector rings are great, and consequently the friction or rubbing effects between the brushes and the surface of the collector rings are considerable, there has been considerable difficulty in securing satisfactory operation and life, from both mechanical and electrical standpoints, with the ordinary designs and constructions. Collector rings of machines of this character are ordinarily intended to carry currents of large amperage, and if these currents are led to and from the collector rings through leads which are tapped into or connected to the rings at a single point, or a relatively small number of points, there is great liability of a highly uneven distribution of current flowing in the several sections of the ring, with consequent considerable losses and heating.

The present invention contemplates the use in machines of this general character of a collector ring formed of material of considerable mechanical strength, such as forged steel, capable of maintaining itself and associated parts in spite of the high stresses set up during operation of such a collector ring of relatively large diameter and at very high operating speeds; and an additional characteristic of such a ring is its particularly good wearing qualities at high rubbing speeds between the brushes and the surface of the ring. And the present invention contemplates extremely desirable provisions for connecting the circuit leads to the collector rings in such a manner as to insure efficient mechanical support and mounting of the leads and an even distribution of current from the leads to and about the full extent of the collector ring. Likewise, features of the invention insure the possibility of securing long life of the parts of the collector ring, even at very high rubbing speeds between the brushes and the ring, and minimum losses and heating incident to the leading of current to and from the collector rings and the distribution of current therein.

An object of the present invention is to provide an improved current-collecting device for electrical machines which is of simple design and construction and efficient in operation.

It is a further object of the present invention to provide an improved current-collecting device of this general character embodying a portion of great mechanical strength and ability to resist wear occasioned by rubbing, and another portion capable of leading current to and from the contact surface portion of the ring with maximum efficiency.

It is a further object of the present invention to provide an improved current-collecting device of the above defined character and wherein the contact engagement between the current carrying leads and the collector ring is made over such an extended area of low resistance as to insure even distribution of current about the collector ring and minimum losses due to heating.

These and other objects and advantages are attained by the present invention, various novel features of which will appear from the description and drawings, disclosing one embodiment of the invention, and will be more particularly pointed out in the claims.

In the accompanying drawings:

Fig. 1 is a partially sectional elevation of a portion of a dynamo-electric machine having a current-collecting device embodying features of the present invention.

Fig. 2 is a sectional view in the plane of the line II—II of Fig. 1.

In accordance with the disclosure of the drawings, 10 represents the shaft of a dynamo-electric machine which may be considered of the turbo-generator type embodying a rotating field element. A sleeve 12 is secured, ordinarily by shrinking, upon a reduced portion of the shaft 10, this sleeve 12 being of material of great mechanical strength, usually forged steel. 13 and 14 represent collector rings fixedly secured in position upon the supporting sleeve 12 and suitably insulated therefrom. In accordance with the usual practice in the matter, the collector rings are assembled in operative position upon the supporting sleeve 12 prior to securing the sleeve in operative position upon the shaft 10. The preferable arrangement for securing the collector rings in operative position includes the disposition of a sleeve or separator 15 of insulating material of high dielectric strength, preferably mica in molded or pressed condition, upon the supporting sleeve 12. This insulating material may be disposed upon the outside of the sleeve and molded and baked in position thereon, after which the external surface of the insulating material is suitably machined, as by grinding, to present a true cylindrical surface. The collector rings 13 and 14 are machined to present an internal diameter slightly less than the external diameter of the insulating sleeve and, hence, may be readily shrunk into desired position, this shrinking operation definitely insuring that the collector rings are maintained in desired operative position under all conditions liable to be met with in service. 16 represents a layer of cord wound or banded upon the exposed portions of the insulating sleeve 15. When the turns of this cord are tightened and secured in position, the same serve to protect the exposed portions of the insulating sleeve and to maintain the latter against displacement.

With the collector rings mounted in operative position in the manner described hereinabove and the external rubbing surface 17 thereof of true cylindrical form, the brushes may be placed in engagement with the rubbing surfaces and leads suitably connected to the collector rings and the field winding carried by the core mounted on the shaft 10. In order to secure the desired mechanical strength for the purpose of insuring that the collector rings maintain themselves in operative position and condition during a satisfactory long life and likewise serve as a suitable support for the parts associated therewith, these collector rings are preferably of forged steel or similar suitable material insuring great strength and particularly good wearing qualities at high relative rubbing speeds between the bearing surface of the ring and the brushes associated therewith.

The leads carried from the field winding of the machine on the shaft 10 are designated 18 and 19, these leads being disposed in any satisfactory ordinary manner, such as disposing and securing the leads in longitudinal slots adjacent the surface of the shaft 10. In order to secure these leads 18, 19 to the corresponding collector rings 13, 14, respectively, in such a manner as insure a secure mechanical connection between the parts and ample electrical conductivity with the current evenly dividing in the several parts of the collector ring, contact elements 21, 22, of material of high conductivity, are provided for engagement with the collector rings 13, 14, respectively, over an extended area along side walls of the rings. As indicated, each of the contact elements 21, 22 is in the form of an annular distributing bus element carried by and secured to the outer lateral wall of the corresponding collector ring, as by bolts 23 passing through the contact element and secured in the body of the collector ring. There is provided on the side wall of each contact element 21, 22 which is in engagement with a corresponding surface of a collector ring, a projection or shoulder 24 which takes in a recess formed by a shouldered portion on the collector ring. This engagement between the collector ring and its contact element serves to center or position the contact element and, in cooperation with the bolts 23, serves to maintain the contact element in operative position against the effect of any stresses set up during operation.

The exposed side surface or wall of each of the contact or current distributing elements 21, 22 is provided with a recess 25 of such size as to receive snugly the flattened end or terminal 26 of the corresponding lead 18, 19, respectively. The recess 25 is of such depth and the side walls of the recess are so extended at their outer portions as to receive a conductive clamping plate 27 of arcuate form which, when secured in operative position, has its inner surface bearing upon the outer surface of the terminal 26 of the lead and cut away portions of the walls of the recess in the contact element and has its outer surface flush with the outer surface of the contact element. With this clamping plate 27 secured in operative position, as by means of screws or bolts 28, the terminal 27 of each lead is effectively maintained in secure mechanical connection and efficient electrical engagement with the annular contact element 21 or 22 secured to the collector rings 13, 14, respectively.

It will be apparent that, in accordance with the present invention, features of which are described hereinabove, maximum strength and security is insured in the matter of maintaining the collector rings and associated parts in operative position; and the design and construction is such as to insure particularly good wearing qualities at relatively high rubbing speeds between the collector ring and the brushes, and the provisions for leading the current to and from the collector rings are of such a character as to insure a comparatively even distribution of current throughout the several sections of the collector ring with maximum operating efficiency and minimum losses from heating.

It should be understood that the invention claimed is not limited to the exact details of construction shown and described herein, for various modifications within the scope of the invention will be apparent to persons skilled in the art.

It is claimed and desired to secure by Letters Patent:

1. In a current-collecting device for electrical machines, a supporting member, a collector ring of material of relatively great tensile strength secured in position on said supporting member, a current lead, and a connection from said lead to said collector ring including a conductive current-distributing member of material of less tensile strength but greater electrical conductivity than said collector ring and having electrical engagement with said collector ring over an extended area thereof.

2. In a current-collecting device for electrical machines, a supporting member, a collector ring secured in position on said supporting member, a current lead, and a connection from said lead to said collector ring including a current distributing element of arcuate form and of material of greater electrical conductivity than said collector ring and secured in electrical engagement with said collector ring over an extended area thereof.

3. In a current-collecting device for electrical machines, a supporting member, a collector ring secured in position on said supporting member, a current lead, and a connection from said lead to said collector ring including an annular current distributing element secured to said collector ring over an extended area thereof.

4. In a current-collecting device for electrical machines, a supporting member, a collector ring of material of relatively great strength secured in position on said supporting member, a current lead, and a connection from said lead to said collector ring including a current-distributing element of material of greater electrical conductivity than said collector ring and of arcuate form secured in electrical engagement with a side surface of said collector ring over an extended area thereof.

5. In a current-collecting device for electrical machines, a supporting member, a collector ring of material of relatively great tensile strength secured in position on said supporting member, a current lead, and a connection from said lead to said collector ring including an annular current-distributing element of material of greater electrical conductivity and lower tensile strength than said collector ring secured in engagement therewith over a surface of substantially annular shape.

6. In a current-collecting device for electrical machines, a supporting member, a collector ring secured in position on said supporting member, a current lead, and a connection from said lead to said collector ring including a current-distributing element of arcuate form secured in electrical engagement with a side surface of said collector ring, said current-distributing element having a lateral projection extending beneath a shouldered portion of said collector ring.

7. In a current-collecting device for electrical machines, a supporting member, a collector ring secured in position on said supporting member, a current lead, and a current-distributing element of arcuate form in circuit with said lead and secured in electrical engagement with said collector ring over an extended area thereof, said collector ring being provided with a recess, and said current-distributing element provided with a lateral projection extending within said recess and positioned by the walls thereof.

8. In a current-collecting device for electrical machines, a supporting member, a collector ring secured in position on said supporting member, a current lead, and a current-distributing element of arcuate form secured in electrical engagement with said collector ring over an extended area thereof, a side wall of said current-distributing element being recessed, and a terminal portion of said lead disposed and secured in said recess of said current-distributing element.

9. In a current-collecting device for electrical machines, a supporting member, a collector ring secured in position on said supporting member, a current lead, and an annular current-distributing element secured to said collector ring, said collector ring being provided with a recess, and said current-distributing element provided with a lateral projection extending within said recess and positioned by the walls thereof, a side wall of said current-distributing element being recessed, and a terminal portion of said lead disposed and secured within said recess of said current-distributing element.

10. In a current-collecting device for electrical machines, a support, a collector ring of material of high tensile strength secured in position on said support, a current lead, and a current-distributing element of material of appreciably less tensile strength and greater electrical conductivity than said collector ring and of arcuate form connected in circuit with said lead and secured in electrical engagement with said collector ring over an extended area thereof.

11. In a current-collecting device for electrical machines, a support, a collector ring of material of high tensile strength secured in position on said support, a current lead, and an annular current-distributing element of material of appreciably less tensile strength and greater electrical conductivity than said collector ring connected in circuit with said lead and secured in electrical engagement with said collector ring over a substantially annular area.

12. In a current-collecting device for electrical machines, a support, a collector ring of material of high tensile strength secured in position on said support, a current lead, and an annular current-distributing element of material of appreciably less tensile strength and greater electrical conductivity than said collector ring connected in circuit with said lead and secured in electrical engagement with said collector ring over a substantially annular area, said current-distributing element having a lateral projection engaging within a recess in a side wall of said collector ring.

In testimony whereof, the signature of the inventor is affixed hereto.

ROBERT B. WILLIAMSON.